United States Patent
Inoue et al.

(10) Patent No.: US 6,928,823 B2
(45) Date of Patent: Aug. 16, 2005

(54) GAS TURBINE COMBUSTOR AND OPERATING METHOD THEREOF

(75) Inventors: Hiroshi Inoue, Hitachinaka (JP); Tomomi Koganezawa, Hitachi (JP); Nariyoshi Kobayashi, Hitachinaka (JP); Isao Takehara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/382,499

(22) Filed: Mar. 7, 2003

(65) Prior Publication Data

US 2004/0000146 A1 Jan. 1, 2004

Related U.S. Application Data

(63) Continuation-in-part of application No. 10/083,360, filed on Feb. 27, 2002.

(30) Foreign Application Priority Data

Aug. 29, 2001 (JP) .......................................... 2001-259119

(51) Int. Cl.[7] .............................................. F02C 7/228
(52) U.S. Cl. .............................. 60/776; 60/737; 60/746
(58) Field of Search .......................... 60/737, 740, 746, 60/773, 776

(56) References Cited

U.S. PATENT DOCUMENTS

| | | | | |
|---|---|---|---|---|
| 5,321,950 A | * | 6/1994 | Shekleton et al. | 60/740 |
| 5,339,635 A | * | 8/1994 | Iwai et al. | 60/746 |
| RE34,962 E | * | 6/1995 | Shekleton et al. | 60/746 |
| 5,651,252 A | * | 7/1997 | Ansart et al. | 60/737 |
| 5,722,230 A | * | 3/1998 | Cohen et al. | 60/737 |
| 5,899,074 A | * | 5/1999 | Komatsu et al. | 60/737 |
| 6,389,815 B1 | * | 5/2002 | Hura et al. | 60/746 |
| 6,481,209 B1 | * | 11/2002 | Johnson et al. | 60/746 |
| 6,684,641 B2 | * | 2/2004 | Moriya et al. | 60/737 |

* cited by examiner

Primary Examiner—Michael Koczo, Jr.
(74) Attorney, Agent, or Firm—Mattingly, Stanger, Malur & Brundidge, P.C.

(57) ABSTRACT

A gas turbine combustor has a combustion chamber into which fuel and air are supplied, wherein the fuel and the air are supplied into said combustion chamber as a plurality of coaxial jets.

4 Claims, 15 Drawing Sheets

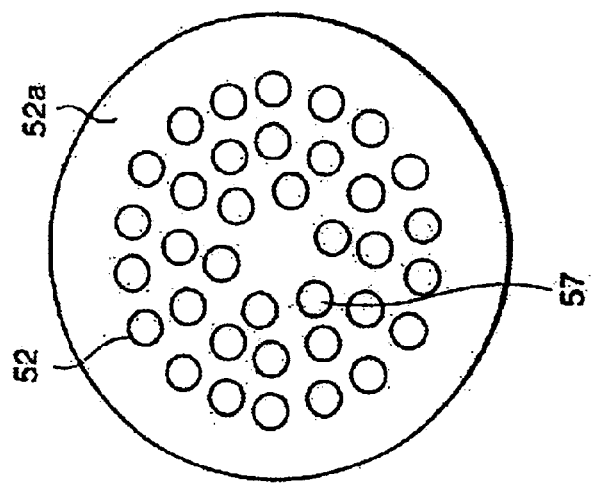
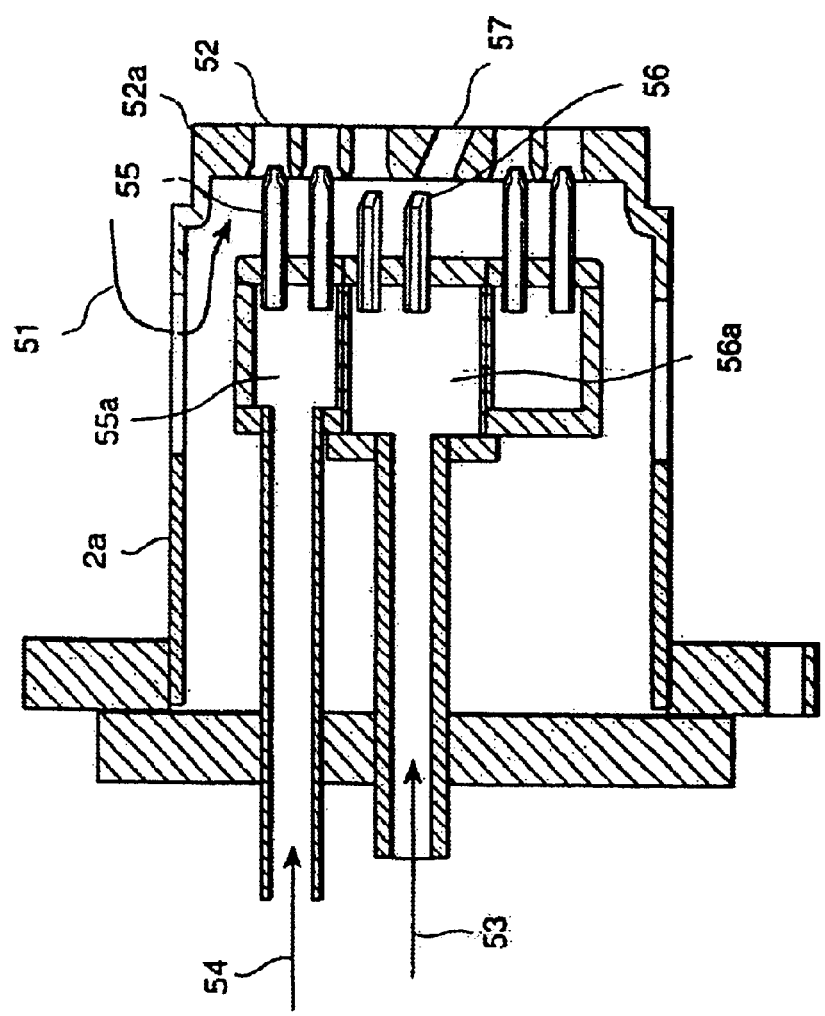
FIG. 4 (a)
FIG. 4 (b)

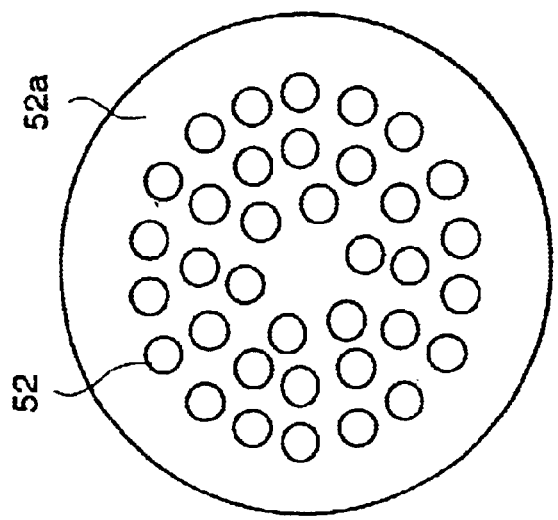
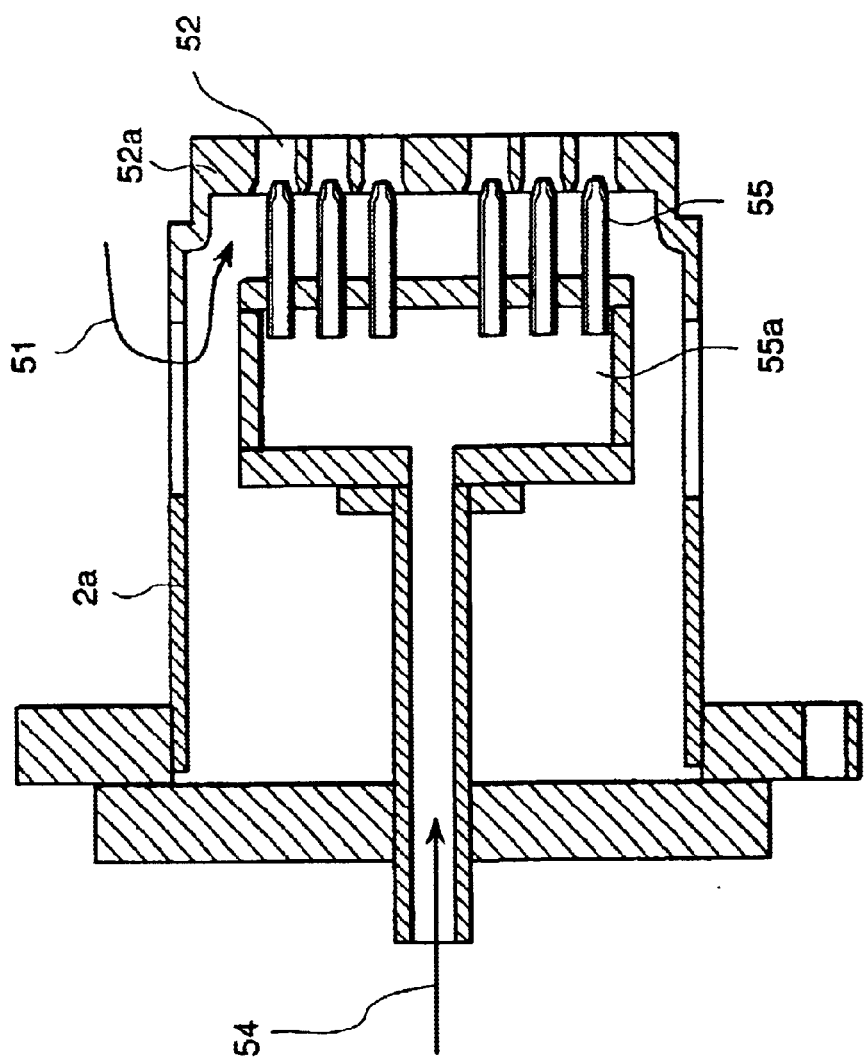

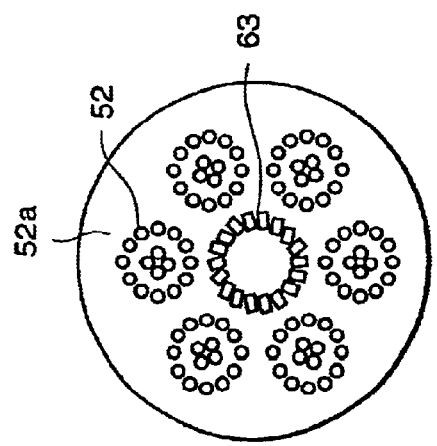
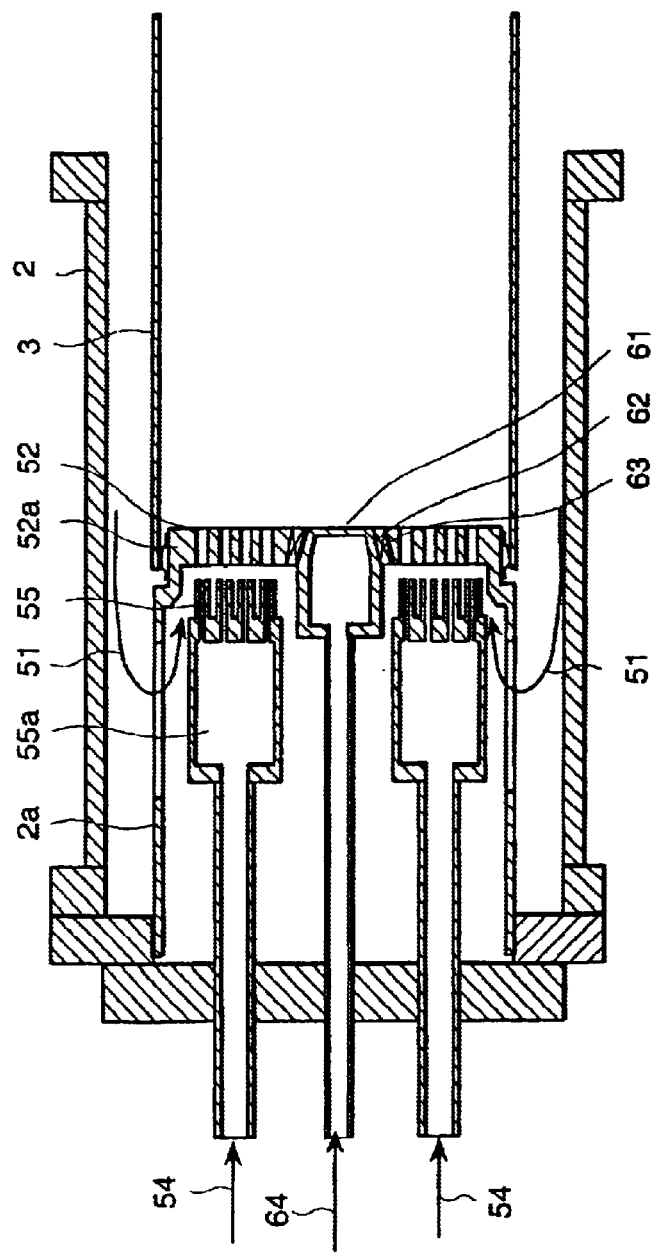
FIG. 8 (a)
FIG. 8 (b)

GAS TURBINE COMBUSTOR AND OPERATING METHOD THEREOF

This is a continuation-in-part (CIP) application of U.S. Ser. No. 10/083,360 filed Feb. 27, 2002, now pending, the entire disclosure of which is hereby incorporated by reference.

BACKGROUND OF THE INVENTION

1. Field of the Invention

The present invention relates to a gas turbine combustor and an operating method thereof.

2. Description of Prior Art

The present invention specifically relates to a low NOx type gas turbine combustor which emits low levels of nitrogen oxides. The prior art has been disclosed in Japanese Application Patent Laid-Open Publication No. Hei 05-172331.

In a gas turbine combustor, since the turndown ratio from startup to the rated load condition is large, a diffusion combustion system which directly injects fuel into a combustion chamber has been widely employed so as to ensure combustion stability in a wide area. Also, a premixed combustion system has been made available.

In said prior art technology, a diffusion combustion system has a problem of high level NOx. A premixed combustion system also has problems of combustion stability, such as flash back, and flame stabilization during the startup operation and partial loading operation. In actual operation, it is preferable to simultaneously solve those problems.

SUMMARY OF THE INVENTION

The main purpose of the present invention is to provide a gas turbine combustor having low level NOx emission and good combustion stability and an operating method thereof.

The present invention provides a gas turbine combustor having a combustion chamber into which fuel and air are supplied, wherein the fuel and the air are supplied into said combustion chamber as a plurality of coaxial jets.

Further, a method of operating a gas turbine combustor according to the present invention is the method of operating a gas turbine combustor having a combustion chamber into which fuel and air are supplied, wherein the fuel and the air are supplied into said combustion chamber as a plurality of coaxial jets.

BRIEF DESCRIPTION OF THE DRAWINGS

FIG. 4($a$) is a sectional view of a nozzle portion of a first embodiment according to the present invention.

FIG. 4($b$) is a side view of FIG. 4($a$).

FIG. 5($a$) is a sectional view, for detailed explanation, of a nozzle portion of a second embodiment according to the present invention.

FIG. 5($b$) is a side view of FIG. 5($a$).

FIG. 6($b$) is a side view of FIG. 6($a$).

FIG. 7($b$) is a side view of FIG. 7($a$).

FIG. 8($a$) is a sectional view, for detailed explanation, of a nozzle portion of a fifth embodiment according to the present invention.

FIG. 8($b$) is a side view of FIG. 8($a$).

FIG. 9($b$) is a side view of FIG. 9($a$).

FIG. 13($b$) is a side view for detailed explanation of a nozzle portion of the ninth embodiment of the present invention;

FIG. 16($b$) is a side view for detailed explanation of another nozzle portion of the tenth embodiment of the present invention.

DESCRIPTION OF THE PREFERRED EMBODIMENTS

First, two kinds of combustion systems for a gas turbine combustor will be described.

Figure 2:
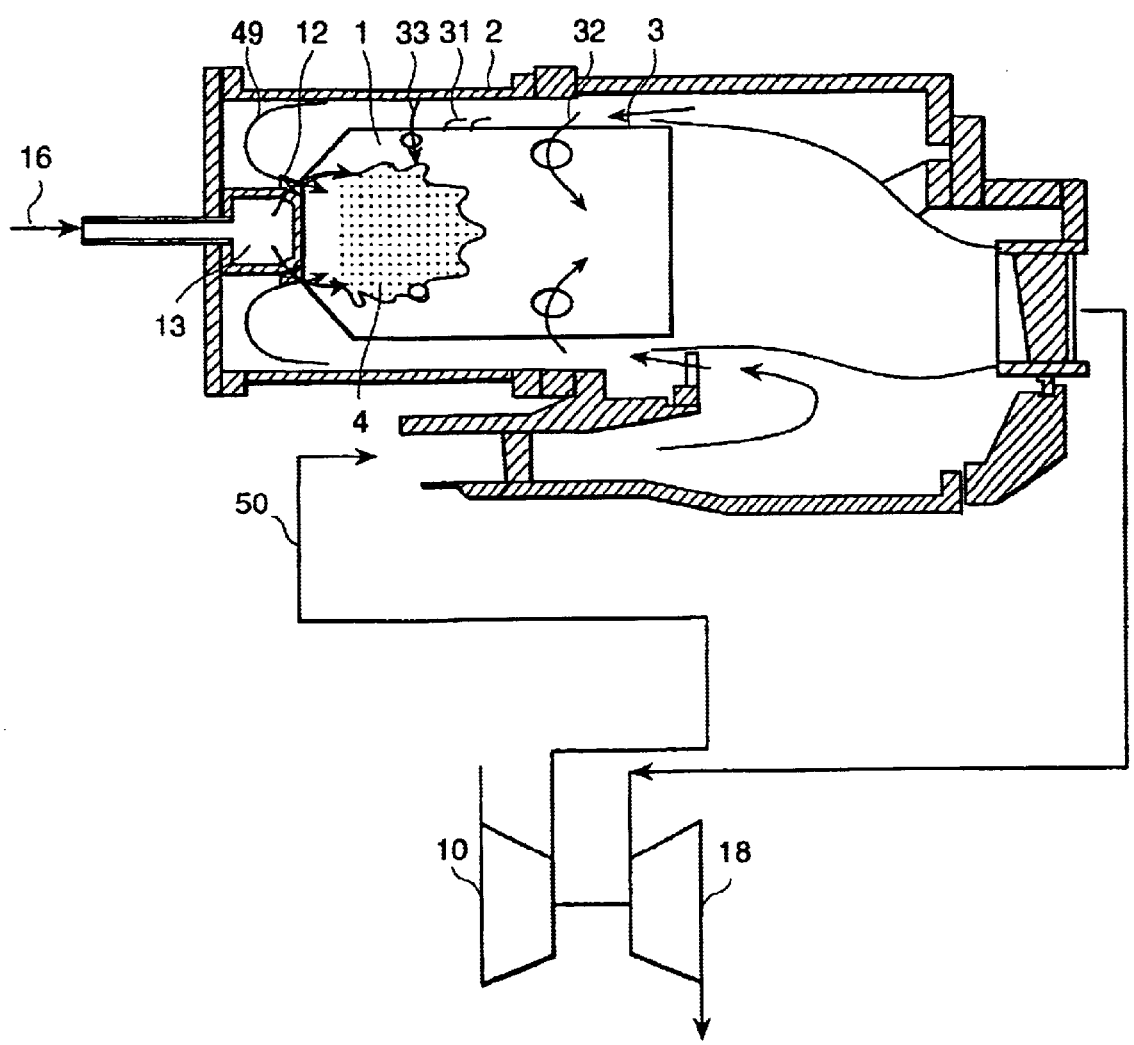
FIG. 2 is a sectional view, for explanation, of a diffusion combustion system.

(1) In a diffusion combustion system, as shown in FIG. 2, fuel is injected outward in the vicinity of the outlet of an air swirler arranged at a combustor head portion so as to intersect with a swirling air flow, generating a circulating flow on the central axis, thereby stabilizing a diffusion flame.

In FIG. 2, air 50 sent from a compressor 10 passes between an outer casing 2 and a combustor liner 3, and a portion of the air flows into a combustion chamber 1 as diluting air 32 which promotes mixture of cooling air 31 and combustion gas in the combustor liner, and another portion of the air flows into the combustion chamber 1 through the air swirler 12 as head portion swirling air 49. Gaseous fuel 16 is injected outward from a diffusion fuel nozzle 13 into the combustion chamber 1 so as to intersect with the swirling air flow, and forms a stable diffusion flame 4 together with the head portion swirling air 49 and primary combustion air 33. Generated high-temperature combustion gas flows into a turbine 18, performs its work, and then is exhausted.

The diffusion combustion system shown herein has high combustion stability, while a flame is formed in a area in which fuel and oxygen reach the stoichiometry, causing the flame temperature to rise close to the adiabatic flame temperature. Since the rate of nitrogen oxide formation exponentially increases as the flame temperature rises, diffusion combustion generally emits high levels of nitrogen oxides, which is not desirable from the aspect of air-pollution control.

Figure 3:
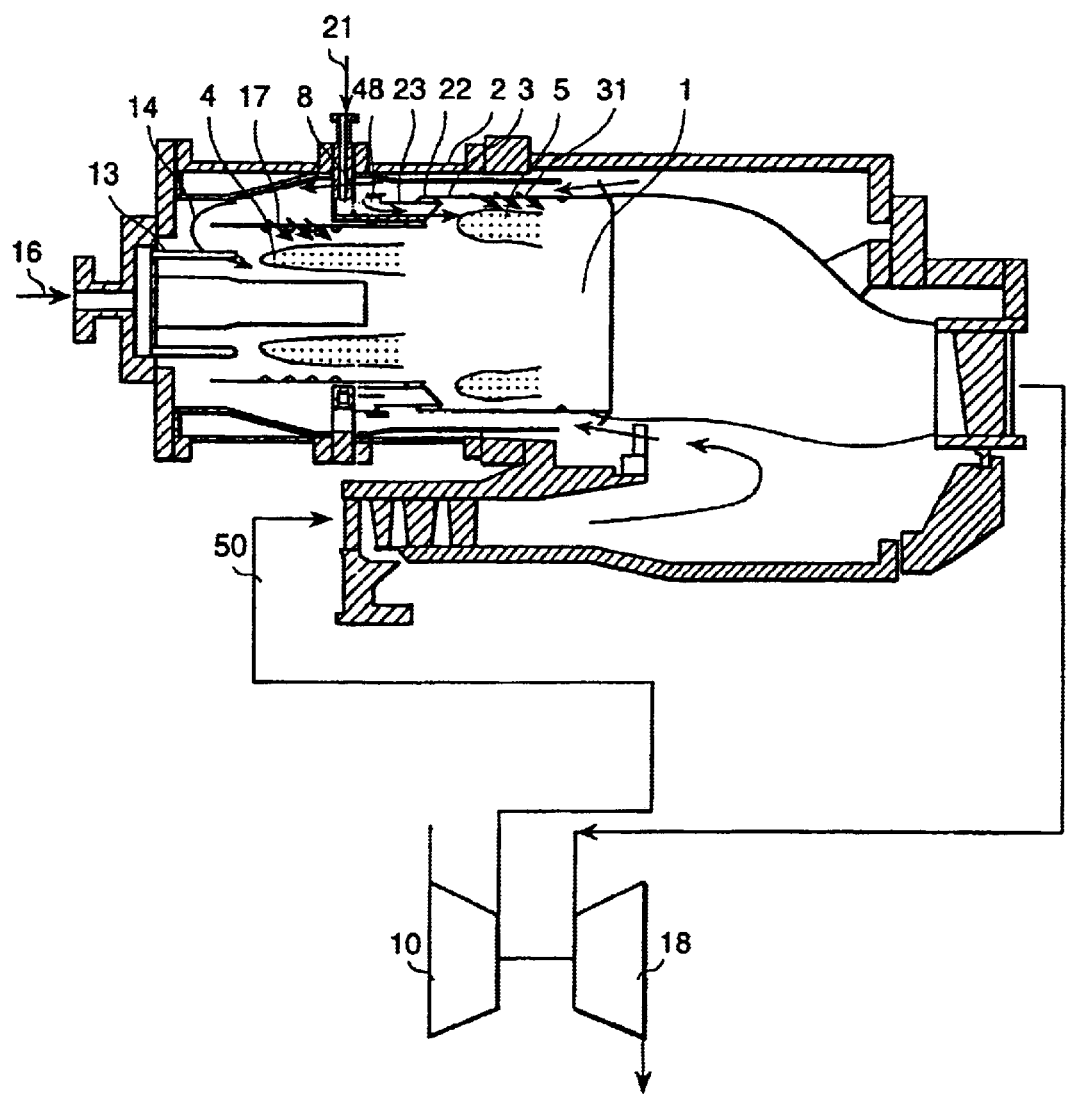
FIG. 3 is a sectional view, for explanation, of a premixed combustion system.

(2) On the other hand, the premixed combustion system is used to lower the level of NOx. FIG. 3 shows an example wherein the central portion employs diffusion combustion having good combustion stability and the outer-periphery side employs premixed combustion having low NOx emission to lower the level of NOx. In FIG. 3, air 50 sent from a compressor 10 passes between an outer casing 2 and a combustor liner 3, and a portion of the air flows into a combustion chamber 1 as cooling air 31 for the combustor liner and combustion gas in the combustor liner, and another portion of the air flows into a premixing chamber 23 as premixed combustion air 48. Remaining air flows into the combustion chamber 1, flowing through a passage between the premixing-chamber passage and the combustor end plate and then through a combustion air hole 14 and a cooling air hole 17. Gaseous fuel 16 for diffusion combustion is injected into the combustion chamber 1 through a diffusion fuel nozzle 13 to form a stable diffusion flame 4. Premixing gaseous fuel 21 is injected into the annular premixing chamber 23 through a fuel nozzle 8, being mixed with air to become a premixed air fuel mixture 22. This premixed air fuel mixture 22 flows into the combustion chamber 1 to form a premixed flame 5. Generated high-temperature combustion gas is sent to a turbine 18, performs its work, and then is exhausted.

However, if such a premixed combustion system is employed, included instable factors peculiar to premixed combustion may cause a flame to enter the premixing chamber and burn the structure, or cause what is called a flash back phenomenon to occur.

In an embodiment according to the present invention, a fuel jet passage and a combustion air flow passage are disposed on the same axis to form a coaxial jet in which the air flow envelops the fuel flow, and also disposed on the wall surface of the combustion chamber to form multihole coaxial jets being arranged such that a large number of coaxial jets can be dispersed. Further, this embodiment is arranged such that a part of or all of the coaxial jets can flow in with a proper swirling angle around the combustor axis. Furthermore, it is arranged such that the fuel supply system is partitioned into a plurality of sections so that fuel can be supplied to only a part of the system during the gas turbine startup operation and partial loading operation.

In the form of a coaxial jet in which the air flow envelopes the fuel, the fuel flows into the combustion chamber, mixes with an ambient coaxial air flow to become a premixed air fuel mixture having a proper stoichiometric mixture ratio, and then comes in contact with a high-temperature gas and starts to burn. Accordingly, low NOx combustion equivalent to lean premixed combustion is possible. At this time, the section which corresponds to a premixing tube of a conventional premixing combustor is extremely short, and the fuel concentration becomes almost zero in the vicinity of the wall surface, which keeps the potential of burnout caused by flash back very low.

Further, by providing an arrangement such that a part of or all of the coaxial jets flow in with a proper swirling angle around the combustor axis, in spite of the form of a coaxial jet flow, it is possible to simultaneously form a recirculating flow to stabilize the flame.

Furthermore, it is possible to ensure the combustion stability by supplying fuel to only a part of the system during the gas turbine startup operation and partial loading operation thereby causing the fuel to become locally over-concentrated and burning the fuel in the mechanism similar to the diffusion combustion which utilizes oxygen in the ambient air.

First Embodiment

Figure 1:
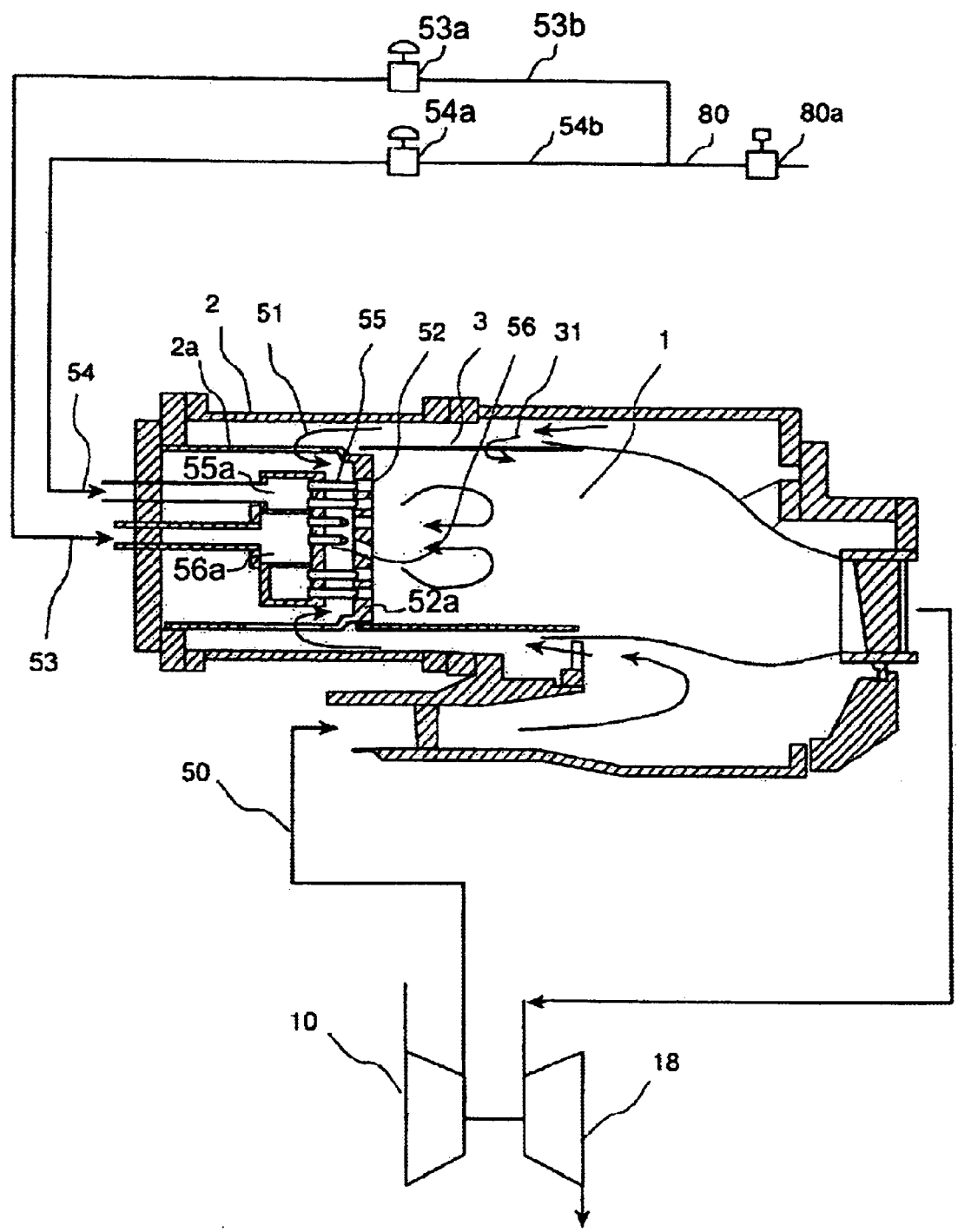
FIG. 1 is a diagram, for explanation, including a general cross-sectional view of a first embodiment according to the present invention.

A first embodiment according to the present invention will be described hereunder with reference to FIG. 1. In FIG. 1, air 50 sent from a compressor 10 passes between an outer casing 2 and a combustor liner 3. A portion of the air 50 is blown into a combustion chamber 1 as cooling air 31 for the combustor liner 3. Further, remaining air 50 is blown into the combustion chamber 1 as coaxial air 51 from the interior of inner cylinder 2a through air holes 52 in an inner end wall 52a of the inner cylinder. End wall 52a is in the form of a disc member.

Fuel nozzles 55 and 56 are disposed coaxially or almost coaxially with combustion air holes 52. Fuel 53 and fuel 54 are injected into a combustion chamber 1 from fuel nozzles 55 and fuel nozzles 56 through supply paths 55a, 56a as jets almost coaxial with the combustion air thereby forming a stable flame. Generated high-temperature combustion gas is sent to a turbine 18, performs its work, and then is exhausted.

In this embodiment, with respect to fuel 53 and fuel 54, a fuel supply system 80 having a control valve 80a is partitioned. That is, the fuel supply system 80 herein is partitioned into a first fuel supply system 54b and a second fuel supply system 53b. The first fuel supply system 54b and the second fuel supply system 53b have individually-controllable control valves 53a and 54a, respectively. The control valves 53a and 54a are arranged such that each valve individually controls each fuel flow rate according to the gas turbine load. Herein, the control valve 53a can control the flow rate of a fuel nozzle group 56 in the central portion, and the control valve 54a can control the flow rate of a fuel nozzle group 55 which is a surrounding fuel nozzle group. This embodiment comprises a plurality of fuel nozzle groups: a fuel nozzle group in the central portion and a surrounding fuel nozzle group, fuel supply systems corresponding to respective fuel nozzle groups, and a control system which can individually control each fuel flow rate as mentioned above.

Next, the nozzle portion will be described in detail with reference to FIGS. 4(a) and 4(b). In this embodiment, the fuel nozzle body is divided into central fuel nozzles 56 and surrounding fuel nozzles 55. On the forward side of the fuel nozzles 55 and 56 in the direction of injection, corresponding air holes 52 and 57 are provided. A plurality of air holes 52 and 57 both having a small diameter are provided on the disciform member 52a. A plurality of air holes 52 and 57 are provided so as to correspond to a plurality of fuel nozzles 55 and 56.

Although the diameter of the air holes 52 and 57 is small, it is preferable to form the holes in such size that when fuel injected from the fuel nozzles 55 and 56 passes through the air holes 52 and 57, a fuel jet and an circular flow of the air enveloping the fuel jet can be formed accompanying the ambient air. For example, it is preferable for the diameter to be a little larger than the diameter of the jet injected from the fuel nozzles 55 and 56.

The air holes 52 and 57 are disposed to form coaxial jets together with the fuel nozzles 55 and 56, and a large number of coaxial jets in which an annular air flow envelopes a fuel jet are injected from the end face of the air holes 52 and 57. That is, the fuel holes of the fuel nozzles 55 and 56 are disposed coaxially or almost coaxially with the air holes 52 and 57, and the fuel jet is injected in the vicinity of the center of the inlet of the air holes 52 and 57, thereby causing the fuel jet and the surrounding annular air flow to become a coaxial jet.

Since fuel and air are arranged to form a large number of small diameter coaxial jets, the fuel and air can be mixed at a short distance. As a result, there is no mal distribution of fuel and high combustion efficiency can be maintained.

Further, since the arrangement of this embodiment promotes a partial mixture of fuel before the fuel is injected from the end face of an air hole, it can be expected that the fuel and air can be mixed at a much shorter distance. Furthermore, by adjusting the length of the air hole passage, it is possible to set the conditions from almost no mixture occurring in the passage to an almost complete premixed condition.

Moreover, in this embodiment, a proper swirling angle is given to the central fuel nozzles 56 and the central air holes 57 to provide swirl around the combustion chamber axis. By providing a swirling angle to the corresponding air holes 57 so as to give a swirling component around the combustion chamber axis, the stable recirculation area by swirl is formed in the air fuel mixture flow including central fuel, thereby stabilizing the flame.

Furthermore, this embodiment can be expected to be greatly effective for various load conditions for a gas turbine. Various load conditions for a gas turbine can be handled by adjusting a fuel flow rate using control valves 53a and 54a shown in FIG. 1.

That is, under the condition of a small gas turbine load, the fuel flow rate to the total air volume is small. In this case, by supplying central fuel 53 only, the fuel concentration level in the central area can be maintained to be higher than the level required for the stable flame being formed. Further, under the condition of a large gas turbine load, by supplying both central fuel 53 and surrounding fuel 54, lean low NOx combustion can be performed as a whole. Furthermore, under the condition of an intermediate load, operation similarly to diffusing combustion which uses ambient air for combustion is possible by setting the equivalence ratio of the central fuel 53 volume to the air volume flown from the air holes 57 at a value of over 1.

Thus, according to various gas turbine loads, it is possible to contribute to the flame stabilization and low NOx combustion.

As described above, by arranging a coaxial jet in which the air flow envelopes the fuel, the fuel flows into the combustion chamber, mixes with an ambient coaxial air flow to become a premixed air fuel mixture having a proper stoichiometric mixture ratio, and then comes in contact with a high-temperature gas and starts to burn. Accordingly, low NOx combustion equivalent to lean premixed combustion is possible. At this time, the section which corresponds to a premixing tube of a conventional premixing combustor is extremely short.

Furthermore, the fuel concentration becomes almost zero in the vicinity of the wall surface, which keeps the potential of burnout caused by flash back very low.

As described above, this embodiment can provide a gas turbine combustor having low level NOx emission and good combustion stability and an operating method thereof.

Second Embodiment

FIGS. 5(a) and 5(b) show the detail of the nozzle portion of a second embodiment. In this embodiment, there is a single fuel system which is not partitioned into a central portion and a surrounding portion. Further, a swirling angle is not given to the nozzles in the central portion and the combustion air holes. This embodiment allows the nozzle structure to be simplified in cases where the combustion stability does not matter much according to operational reason or the shape of the fuel.

Third Embodiment

Figure 6:
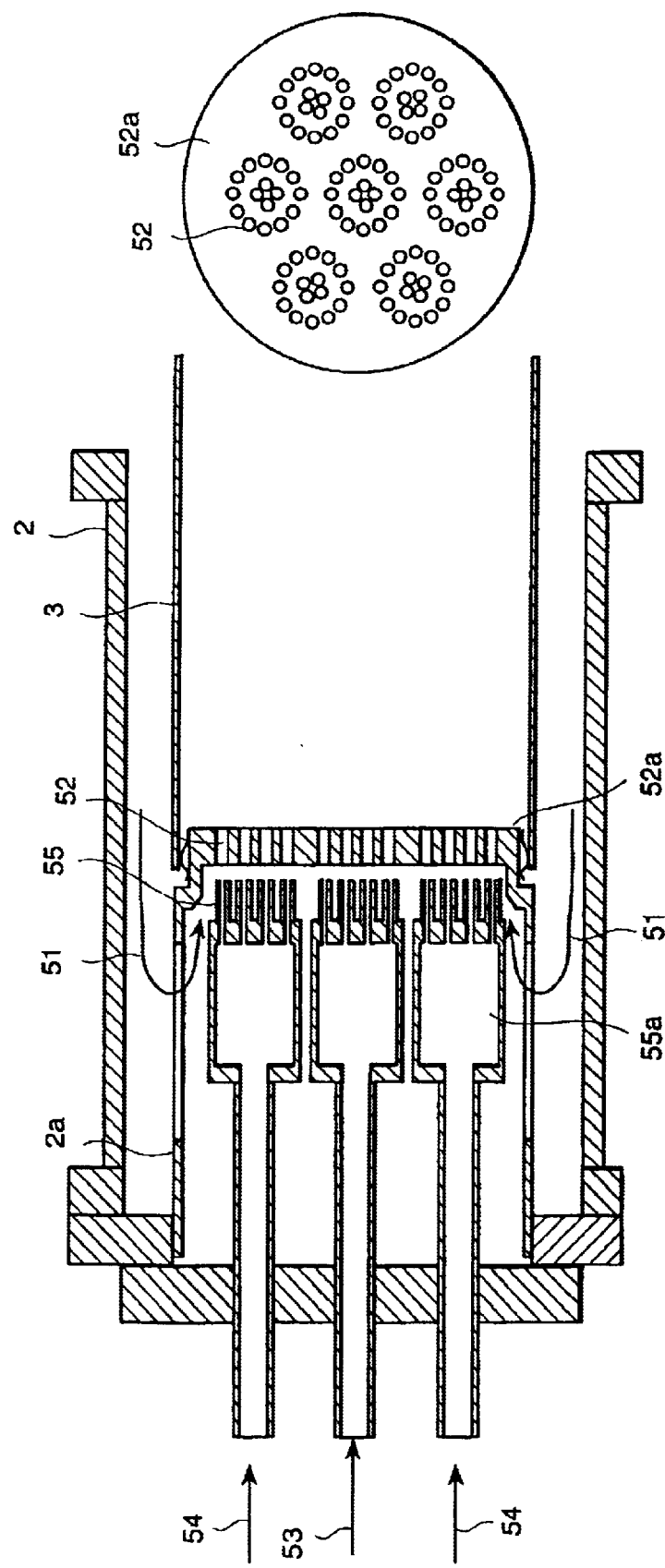
FIG. 6($a$) is a sectional view, for detailed explanation, of a nozzle portion of a third embodiment according to the present invention.

FIGS. 6(a) and 6(b) show a third embodiment. This embodiment is arranged such that a plurality of nozzles of a second embodiment shown in FIG. 5 are combined to form a single combustor. That is, a plurality of modules, each consisting of fuel nozzles and air holes, are combined to form a single combustor.

As described in a first embodiment, such an arrangement can provide a plurality of fuel systems so as to flexibly cope with changes of turbine loads and also can easily provide different capacity per one combustor by increasing or decreasing the number of nozzles.

Fourth Embodiment

Figure 7:
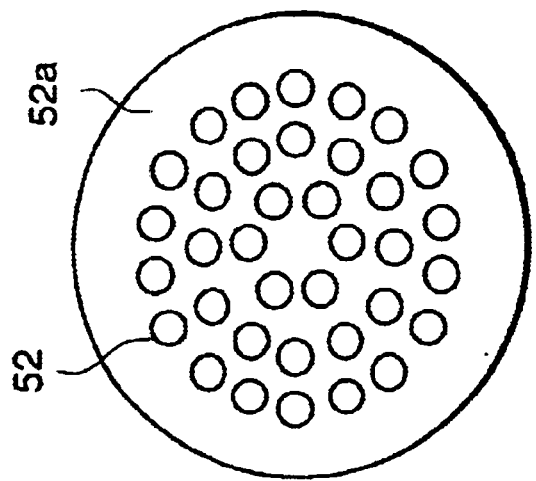
FIG. 7($a$) is a sectional view, for detailed explanation, of a nozzle portion of a fourth embodiment according to the present invention.
Figure 7:
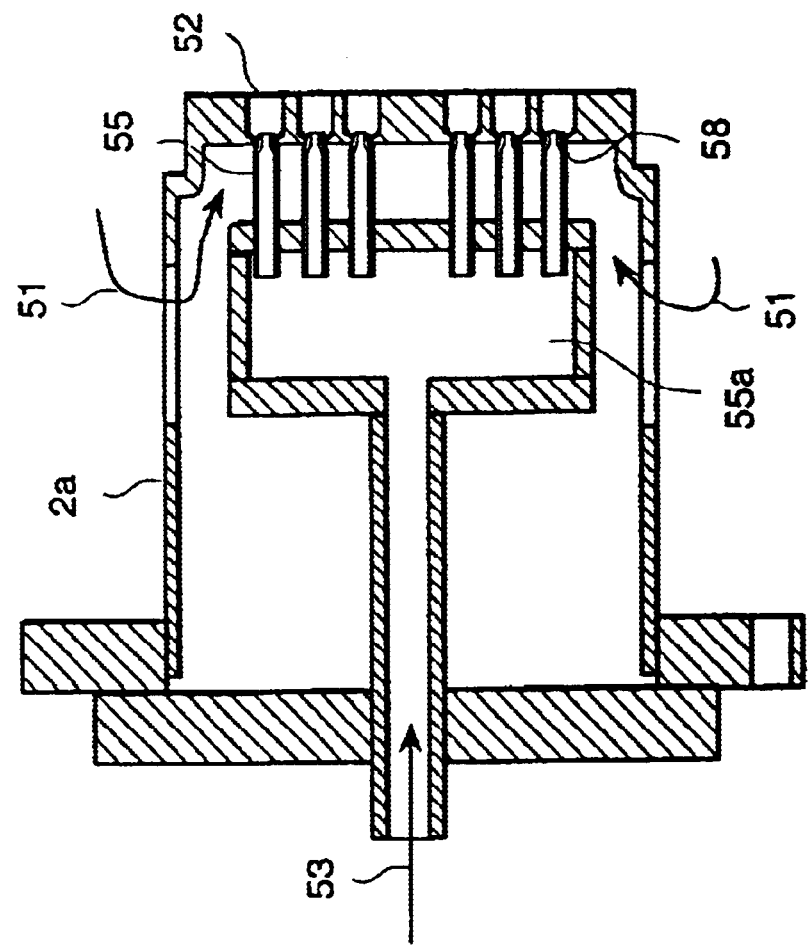

FIGS. 7(a) and 7(b) show a fourth embodiment. This embodiment is basically the same as a second embodiment, however, the difference is that a swirling component is given to a coaxial jet itself by an air swirler 58.

This arrangement promotes mixture of each coaxial jet, which makes more uniform low NOx combustion possible. The structure of the fuel nozzle which gives a swirling component to a fuel jet can also promote mixture.

Fifth Embodiment

FIGS. 8(a) and 8(b) show a fifth embodiment. The difference of this embodiment is that the nozzle mounted to the central axis of a third embodiment is replaced with a conventional diffusing burner 61 which comprises air swirlers 63 and fuel nozzle holes 62 which intersect with the swirlers, respectively.

By using a conventional diffusing combustion burner for startup, increasing velocity, and partial loading in this arrangement, it is considered that this embodiment is advantageous when the starting stability is a major subject.

Sixth Embodiment

Figure 9:
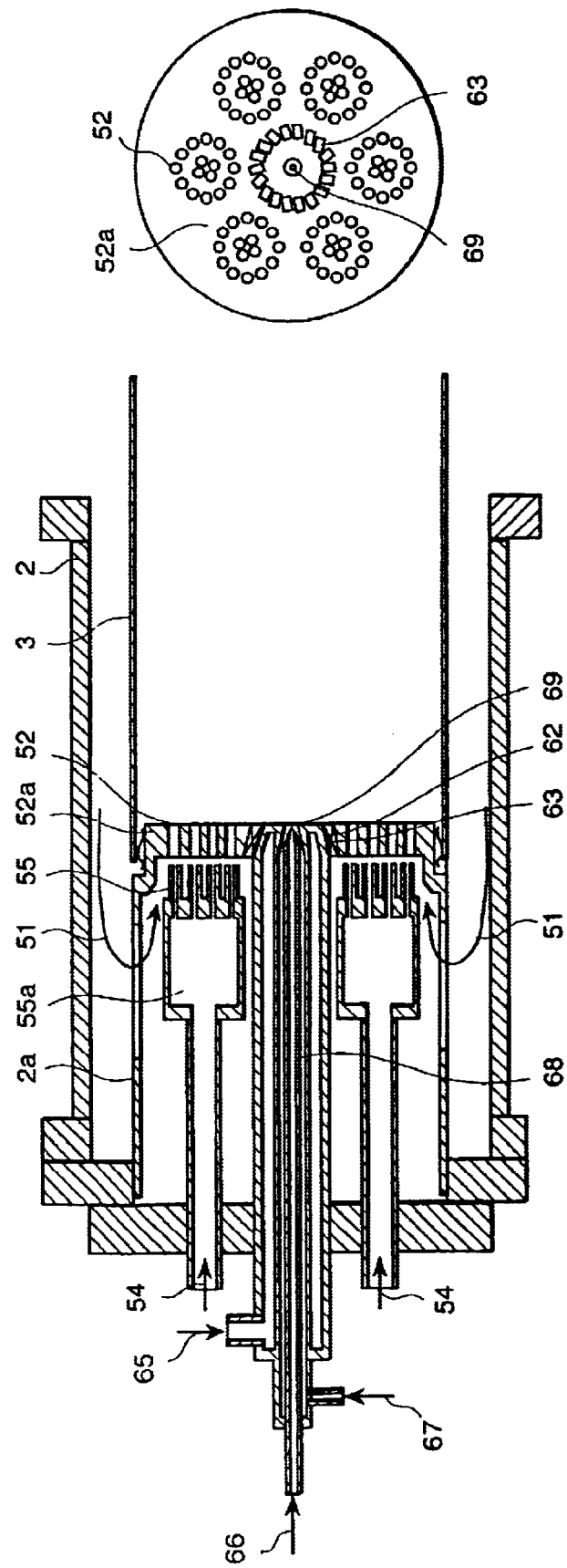
FIG. 9($a$) is a sectional view, for detailed explanation, of a nozzle portion of a sixth embodiment according to the present invention.

FIGS. 9(a) and 9(b) show a sixth embodiment. This embodiment has a liquid fuel nozzle 68 and a spray air nozzle 69 in the diffusing burner 61 according to the embodiment shown in FIGS. 8(a) and 8(b) so that liquid fuel 66 can be atomized by spray air 65 thereby handling liquid fuel combustion. Fuel 67 is supplied to the liquid fuel nozzle 68. Although, from the aspect of low level NOx emission, not much can be expected from this embodiment, this embodiment provides a combustor that can flexibly operate depending on the fuel supply condition.

Seventh Embodiment

Figure 10:
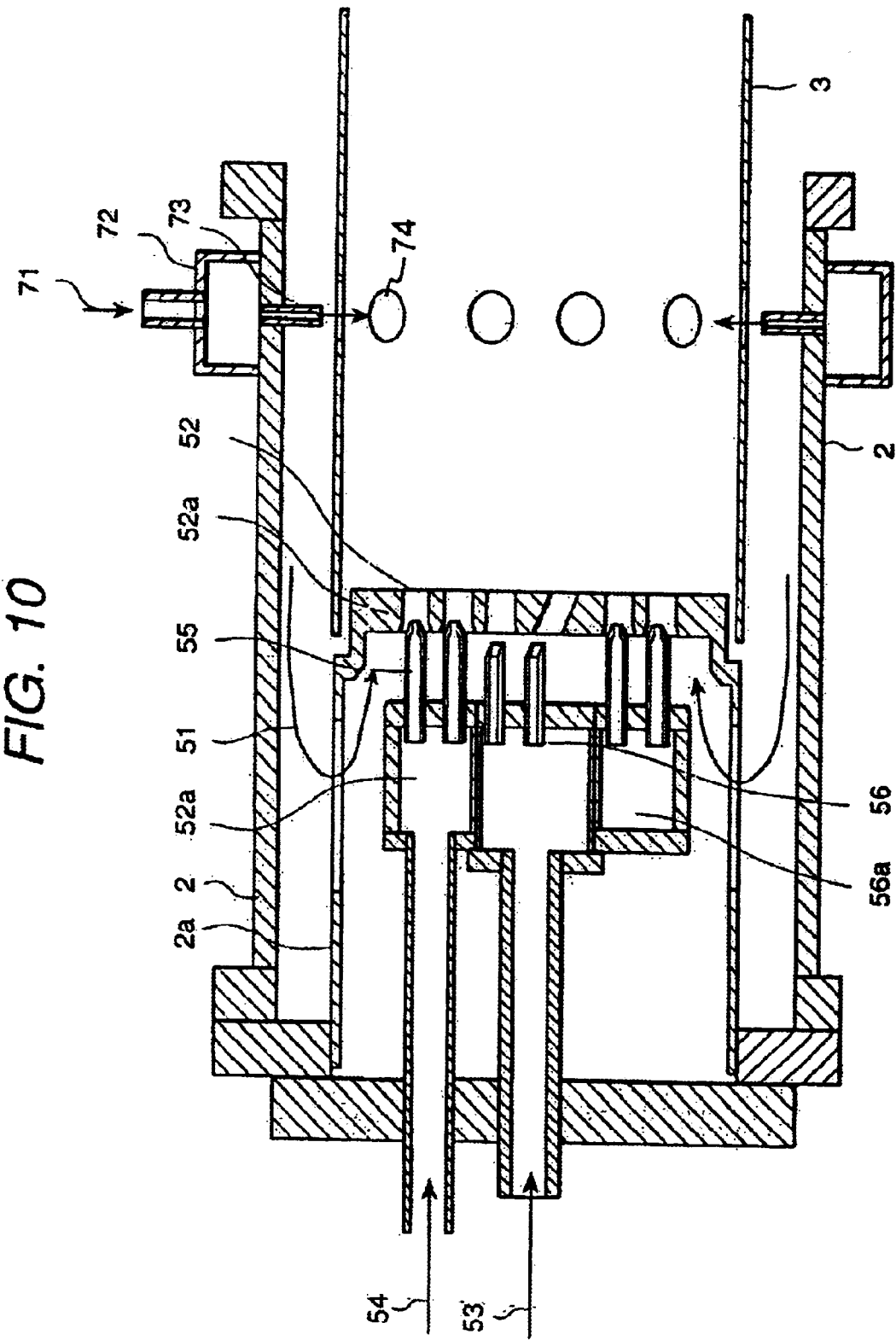
FIG. 10 is a sectional view, for detailed explanation, of a nozzle portion of a seventh embodiment according to the present invention.

FIG. 10 shows a seventh embodiment. This embodiment provides an auxiliary fuel supply system 71, a header 72, and a nozzle 73 on the downstream side of the combustor in addition to a first embodiment shown in FIG. 1 and FIGS. 4(a) and 4(b). Fuel injected from a nozzle 73 flows into a combustion chamber as a coaxial jet through an air hole 74, and combustion reaction is promoted by a high-temperature gas flowing out of the upstream side.

Although such an arrangement makes the structure complicated, it is possible to provide a low NOx combustor which can more flexibly respond to the load.

Eighth Embodiment

Figure 11:
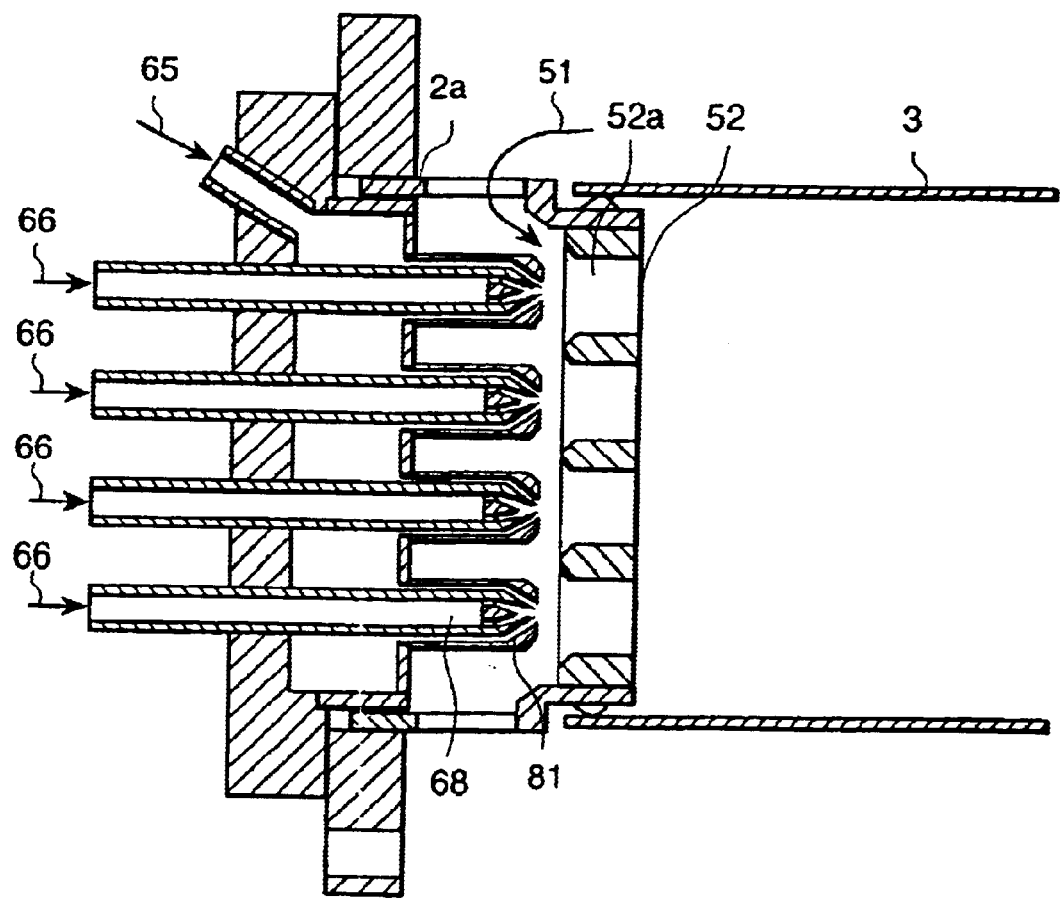
FIG. 11 is a sectional view, for detailed explanation, of a nozzle portion of an eighth embodiment according to the present invention.

FIG. 11 shows an eighth embodiment. In this embodiment, each fuel nozzle of the embodiment shown in FIGS. 9(a) and 9(b) is made double structured so that liquid fuel 66 is supplied to an inner liquid-fuel nozzle 68 and spray air 65 is supplied to an outer nozzle 81. This arrangement allows a large number of coaxial jets to be formed when liquid fuel 66 is used, thereby realizing low NOx combustion where there is very little potential of flash back.

Furthermore, it can also function as a low NOx combustor for gaseous fuel by stopping the supply of liquid fuel and supplying gaseous fuel instead of spray air. Thus, it is capable of providing a combustor that can handle both liquid and gaseous fuel.

As described above, by making a part of or all of the fuel nozzles double structured so that spraying of liquid fuel and gaseous fuel can be switched or combined, it is possible to handle both liquid and gaseous fuel.

Thus, according to the above-mentioned embodiment, by arranging a large number of coaxial jets in which the air flow envelopes the fuel, the fuel flows into the combustion chamber, mixes with an ambient coaxial air flow to become a premixed air fuel mixture having a proper stoichiometric mixture ratio, and then comes in contact with a high-temperature gas and starts to burn. Accordingly, low NOx combustion equivalent to lean premixed combustion is possible. At this time, the section which corresponds to a premixing tube of a conventional premixing combustor is extremely short, and the fuel concentration becomes almost zero in the vicinity of the wall surface, which keeps the potential of burnout caused by flash back very low.

This embodiment can provide a gas turbine combustor having low level NOx emission and good combustion stability and an operating method thereof.

Ninth Embodiment

Figure 12:
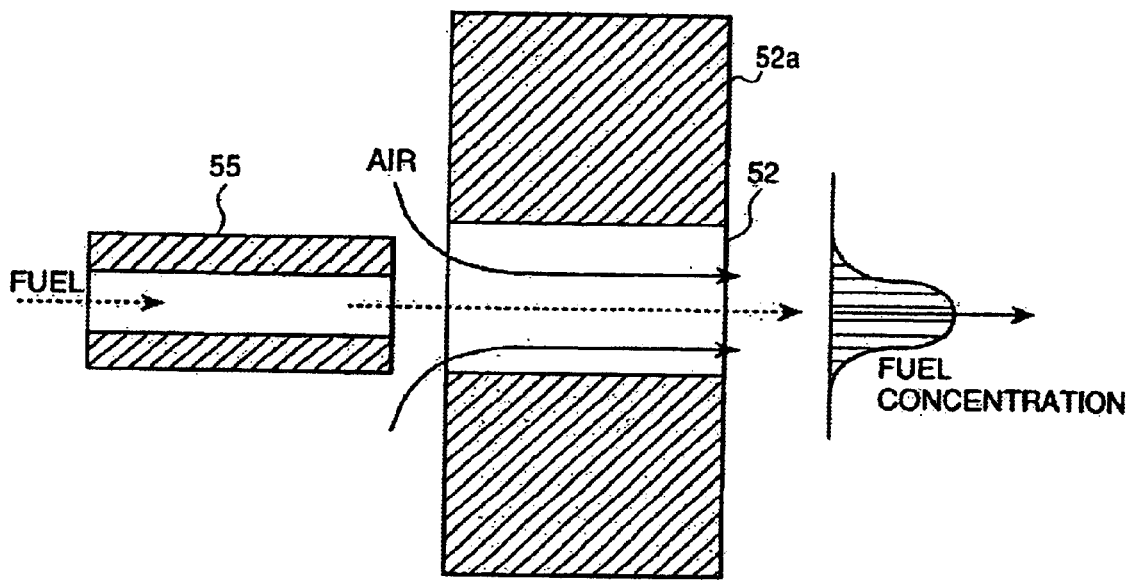
FIG. 12 is a sectional view for detailed explanation of a nozzle portion of a ninth embodiment of the present invention.

FIG. 12 is a sectional view of a part of the fuel nozzle 55 and a combustion air hole 52 formed in disc member 52a, arranged approximately coaxially. The combustion air hole 52 is provided at a downstream side of the fuel nozzle 55 with respect to a fuel jet flow, that is, a premixing flow passage is formed at the downstream side of the fuel jet of the fuel nozzle 55. The size (flow passage cross-sectional area) of the combustion air hole 52 is better to be larger than a cross-sectional area of a fuel jet hole of the fuel nozzle 55. In the present embodiment, the diameter (premixing flow passage diameter area) of the combustion air hole 52 is larger than the fuel injection hole diameter (area) of the fuel nozzle 55. Fuel is jetted from the fuel nozzle 55 through the premixing flow passage while air flows through the premixing flow passage, whereby the fuel and air become a coaxial jet flow. In this case, it is desirable that the fuel from the fuel nozzle 55 is jetted toward a radially central portion of an inlet of the combustion air hole 52 and a good coaxial jet flow is formed. Further, in the case of the present embodiment, a fuel concentration distribution at a downstream side of an air outlet is symmetric with respect to a center of the coaxial flow as shown in FIG. 12, and the fuel and air rapidly mix with each other and the mixture become uniform at the fuel and air run downstream. Thereby, a low NOx performance equivalent to a conventional premixing combustion system is realized by a short premixing distance as compared with the conventional premixing combustion system.

Figure 13:
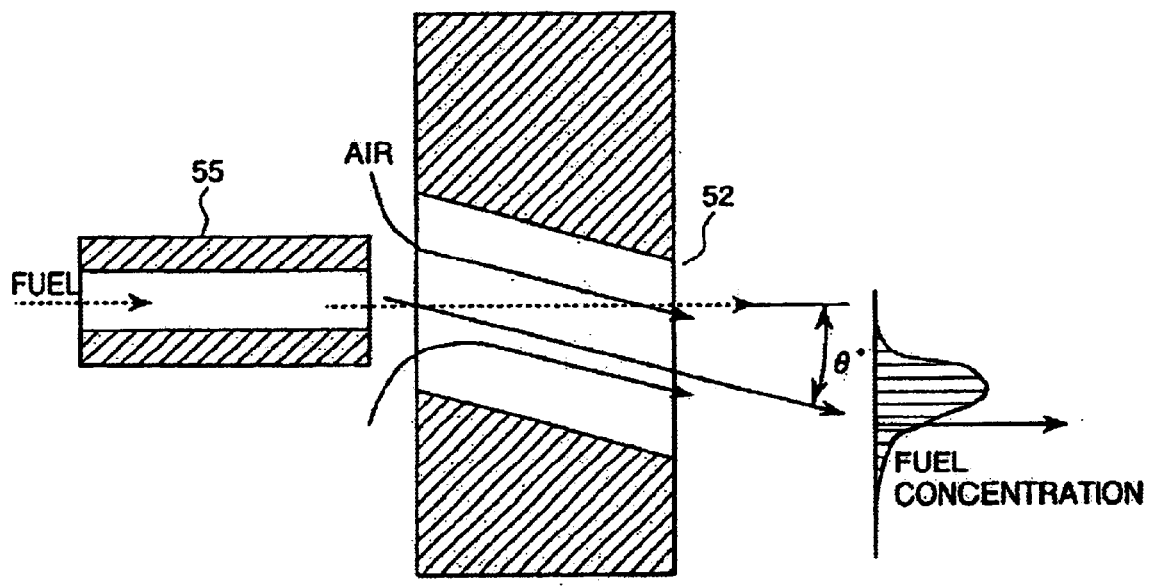
FIG. 13($a$) is a sectional view for detailed explanation of another nozzle portion of the ninth embodiment of the present invention.
Figure 13:
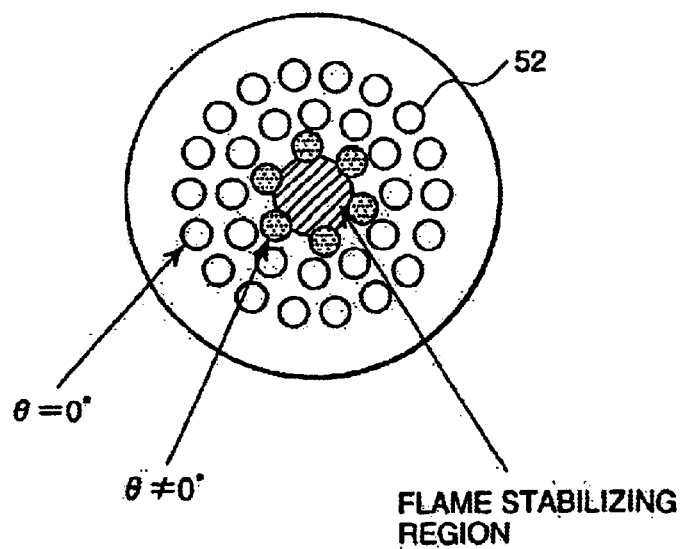

Further, FIG. 13(a) and FIG. 13(b) each show an example that the axis of the combustion air hole 52 is inclined at an angle θ° against the fuel jet axis of the fuel nozzle 55. The combustion air hole 52 is arranged to be coaxial in the vicinity of an inlet thereof but to be inclined against the fuel jet direction. In the case of such an arrangement, a distribution of fuel concentration in a place downstream of the air outlet is asymmetric with respect to the air jet flow axis as shown in FIG. 13(a). The fuel and air becomes mixed and uniform as the fuel air run downstream, however the asymmetry does not completely disappear and a concentration difference exists. For example, for coaxial jet holes near the radial center of a burner or combustor formed of a aggregation of a plurality of coaxial jet holes, as shown in FIG. 13(b), it is considered to positively utilize such a deviation between the fuel jet axis and the air hole axis. That is, in the present embodiment, the burner is constructed so that the above-mentioned inclination (θ°) is provided for the combustion air holes around a flame stabilizing region which is around a radially central portion of the burner, but the inclination is not provided (θ°=0) for the combustion air holes in the other region than the central portion, whereby it is possible to keep the fuel concentration of the flame stabilizing region relatively rich and make the stability of flame stronger. In the present embodiment, by providing only the combustion air holes with an angle not parallel to the axis of the burner such as swirling angle while employing a straight jet hole having no swirling angle or no inward or outward angle, it is possible to provide premixed gas with a swirling angle or an inward or outward angle by a relatively simple construction and it is possible to set a premixed gas flow according to the construction and object of the burner, which is excellent.

Figure 14:
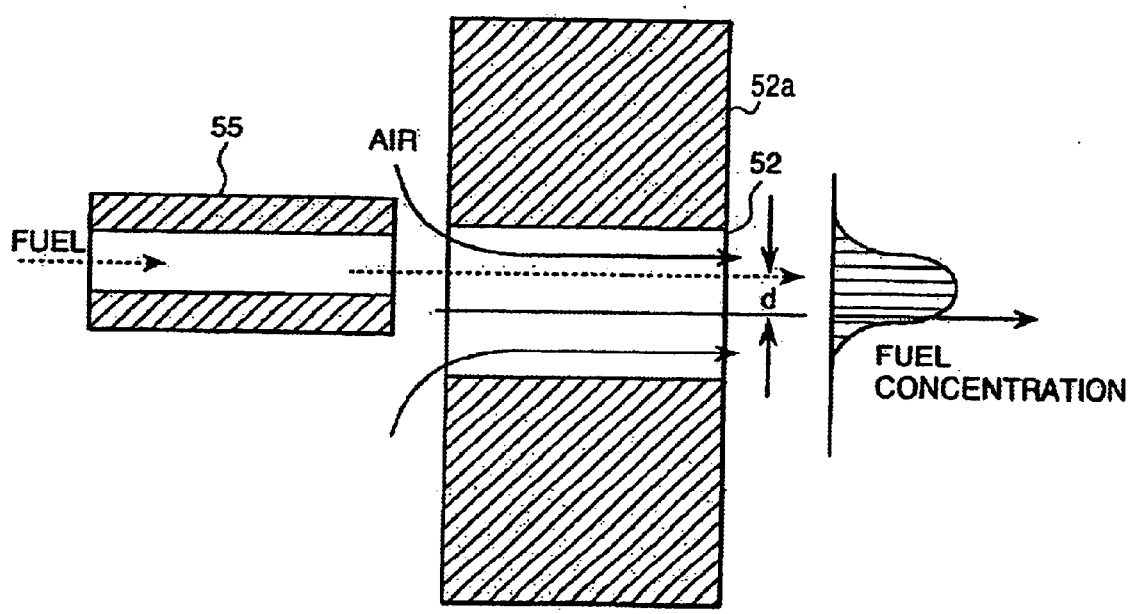
FIG. 14 is a sectional view for detailed explanation of a nozzle portion of the ninth embodiment of the present invention.

Next, FIG. 14 is an example in which an axial position of the fuel jet hole and combustion air hole is the same as in FIG. 12 and a positional deviation (d) in a radial direction is intentionally set therebetween. By the positional deviation, a fuel concentration difference becomes an asymmetric distribution with respect to an axis of air jet flow, whereby it is possible to positively generate a difference in fuel concentration and improve combustion characteristics such as combustion stability.

In the present embodiment as mentioned above, fuel from the fuel nozzle 55 flows along an approximately central portion of premixed gas in the premixing flow passage. Further, the burner is constructed so that air from an outer peripheral side of the fuel nozzle 55 flows in the premixing flow passage along an outer peripheral side thereof. Therefore, the air flows at the outer peripheral side of the fuel flow along the fuel flow in the premixing flow passage, and the fuel and air flows become approximately coaxial. By providing a plurality of nozzles of such formation, it is possible to promote mixing of fuel and air and realize stable combustion by a simple construction.

Figure 15:
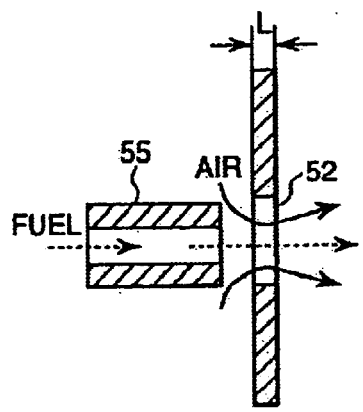
FIGS. 15($a$)–15($f$) are views for detailed explanation of various nozzle formations of the present invention.
Figure 15:
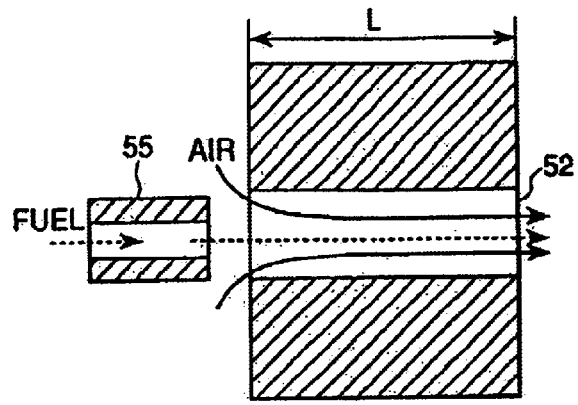
Figure 15:
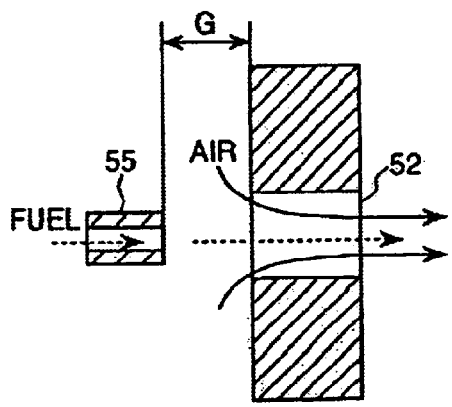
Figure 15:
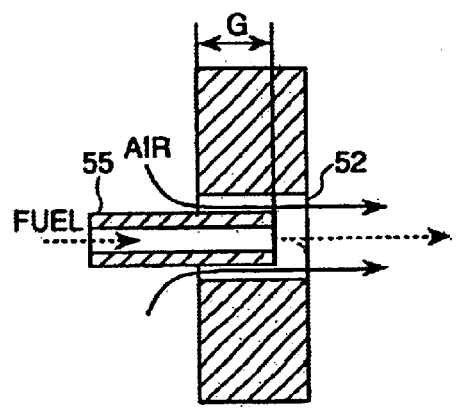
Figure 15:
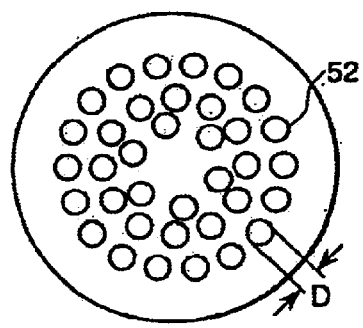
Figure 15:
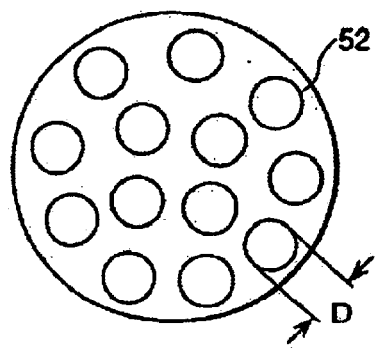

Further, FIG. 15(a) and FIG. 15(b) show an example of a short premixing distance L and an example of a long premixing distance, respectively. The mixing by rapid expansion after being going out of the combustion air hole is predominant, and it is considered that an influence of the premixing distance L on the uniformity of mixing and low NOx performance is not so large. As shown in FIG. 15(a), even if a member forming the combustion air hole is made thin thereby to make the premixing distance L short, it is considered that the low NOx performance is sufficiently secured. On the other hand, saving of the material of the member forming therein the air hole and a work cost of perforation of the air hole can be expected, whereby it is an advantage for cost reduction. FIG. 15(b) shows an example in which the premixing distance L is sufficiently long. It can be expected that fuel and air are sufficiently mixed within the mixing flow passage, and it is possible to provide a burner excellent in low NOx performance. Further, in the case where swirling components are provided by providing an inclination angle for the combustion air hole and a function such as giving an inward or outward deviation angle is provided, also, the mixing distance L is preferable to be about several times as large as the air hole diameter.

FIGS. 15(c) and 15(d) show an example in which axial distances G between an end of the fuel jet hole and an inlet of the air hole are different. FIG. 15(c) shows an example that the axial distance G is large. This example is advantageous in uniform mixing and low NOx performance because a substantial premixing distance can be made long. Further, since the length of the fuel nozzle can be made short, a manufacturing performance of the fuel nozzle is increased and cost reduction is possible. On the other hand, FIG. 15(d) is an example of an arrangement in which a premixing flow passage is formed at a downstream side of the fuel nozzle 55 and the axial distance G is minus, that is, the fuel jet hole projects into inside of the air hole. By such arrangement, potential of backfire can be reduced greatly, and the arrangement is considered to be effective in the case where fuel of excellent ignitability such as dimethylether (DME) is burnt with low NOx emission.

FIGS. 15(e) and 15(f) show an example in which the diameter D of the air hole 52 is small and an example in which it is large, respectively. In the case of FIG. 15(e) in which the diameter D is made small and the number of the air holes are increased thereby, fuel and air are dispersed finely and supplied, so that they are mixed well and uniform in a short distance and it is suited for the case where a lower NOx performance is considered important. In the case where the diameter D of the air hole is made large and the number of the air holes is made less as shown in FIG. 15(f), the mixing distance is necessary to be long and the uniformity of mixing is lost a little, so that the low NOx performance is a little inferior to the above, however, it is advantageous in the case where cost reduction is considered important because working steps are reduced and the required manufacturing precision is not so high.

Tenth Embodiment

Figure 16A:
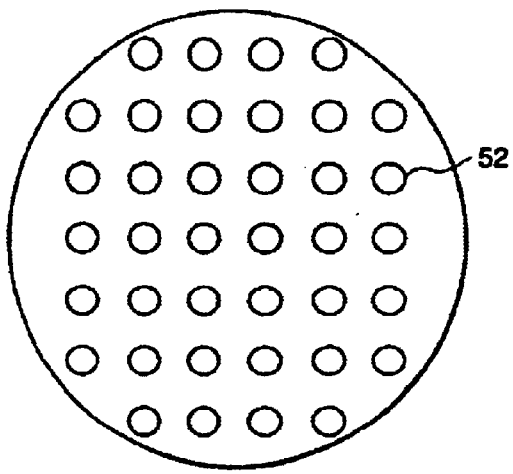
FIG. 16($a$) is a aide view for detailed explanation of a nozzle portion of a tenth embodiment of the present invention.
Figure 16B:
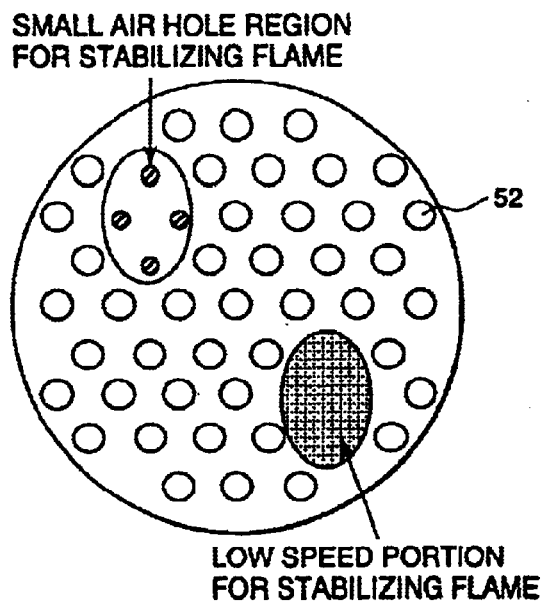

FIG. 16(a) shows another embodiment. In the embodiment described above, the coaxial air holes 52 within a burner plane are arranged coaxially and dispersively, however, basic characteristics are not lost even in lattice or zigzag arrangement of the air holes. FIG. 16(a) shows an example of such an arrangement as mentioned above. In the case of such an arrangement, axial position at which flame is formed is within a section of the liner and substantially the same floating flames are generated although it differs according to an average velocity on a burner liner. It is better on manufacturing because of simple construction, however, in some cases, it is insufficient in flame stability. FIG. 16(b) shows an example for such a case, in which a region in which pitches between air holes 52 are the same and areas of the air holes each are smaller, a region of no air hole or larger pitches, or the like are provided thereby to form a low flow rate portion (low speed portion) and a circulation flow region, whereby flames are stabilized in those regions. With such a construction, potential of backfire is low, and it is possible to provide a burner with both low NOx performance and combustion stability.

Figure 17:
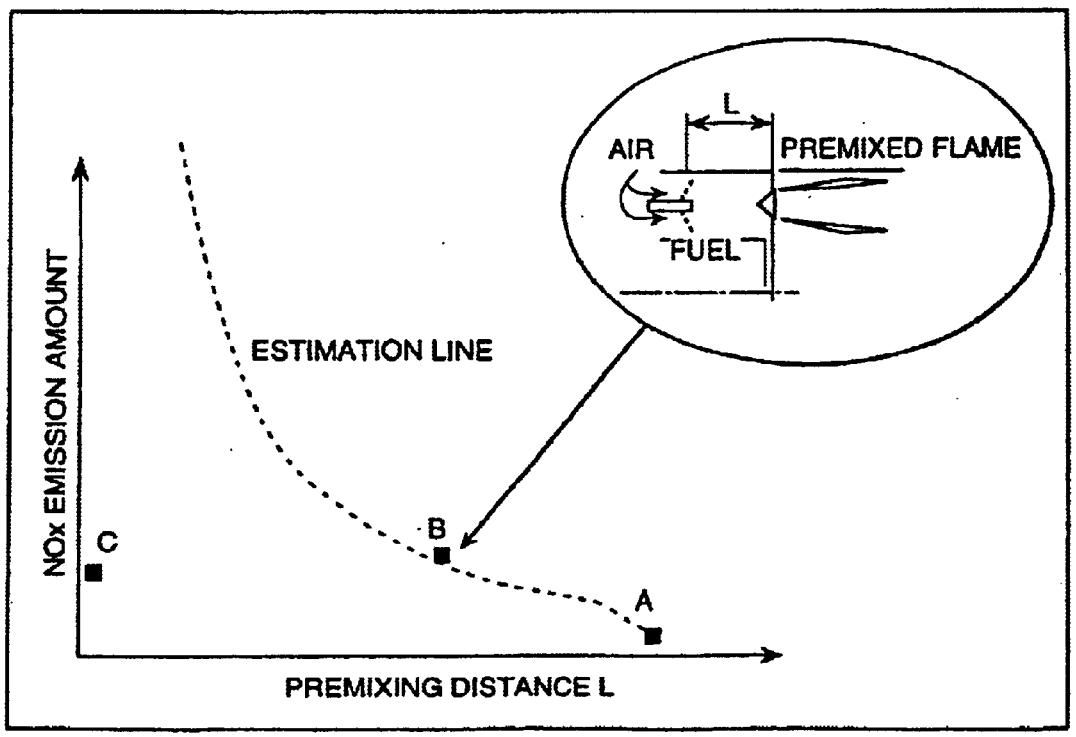
FIG. 17 is a graphical illustration showing a relationship between premixing distances and NOx emission amounts.

FIG. 17 shows an example of experimental results about a relationship between premixing distance L and NOx emission amount in the represent invention. Although complete premixing combustion that fuel and air are mixed completely and then burnt is necessary to use a premixing device with sufficiently long mixing distance or large pressure loss, a NOx emission amount by the complete premixing combustion is very small (a point A in FIG. 17). On the other hand, in a practical premixing device construction which is constructed by arranging a plurality of fuel nozzles in an annular premixing flow passage, NOx emission amount increases in an approximately reverse proportion to the premixing distance L, and an example of NOx emission by such a premixing device is shown by a point B.

On the contrary, in the present invention, a relationship between premixing distance and NOx emission amount in one embodiment of the present invention in which the nozzles and air holes are arranged so as to be a plurality of coaxial jet flows is as shown by a point C in FIG. 17, low NOx performance equivalent to that by a conventional premixing device can be achieved by a premixing distance equal to or smaller than $\frac{1}{20}$ times as long as the premixing distance in the conventional construction although the low NOx performance is less than the perfect premixing combustion.

What is claimed is:

1. A gas turbine combustor having a combustion chamber supplied with fuel and air, comprising:
   a plurality of fuel nozzles each jetting the fuel;
   a disc member arranged at a downstream side of said plurality of fuel nozzles with respect to fuel jet flows; and
   a plurality of premixing flow passages made of holes formed in said disc member and having areas larger than areas of fuel jet holes of said plurality of fuel nozzles, respectively; and
   wherein said plurality of fuel nozzles jet fuel through said plurality of premixing flow passages, respectively, from an upstream side to a downstream side of said combustion chamber.

2. A gas turbine combustor having a combustion chamber supplied with fuel and air, comprising:
   a plurality of fuel nozzles each jetting the fuel;
   a disc member arranged at a downstream side of said plurality of fuel nozzles with respect to fuel jet flows; and
   a plurality of premixing flow passages made of holes formed in said disc member and having diameter areas larger than diameter areas of fuel jet holes of said plurality of fuel nozzles, respectively; and
   wherein fuel from each of said plurality of fuel nozzles flows in said premixing flow passage along approximately a central portion thereof and the air from an outer peripheral side of said fuel nozzle flows in said premixing flow passage along the outer peripheral side thereof, and the fuel is jetted from an upstream side to a downstream side of said combustion chamber through said premixing flow passages.

3. A gas turbine combustor comprising:
   a combustion chamber supplied with fuel and air;
   a plurality of fuel nozzles each jetting the fuel;
   a disc member arranged at a downstream side of said plurality of fuel nozzles with respect to fuel jet flows; and
   a plurality of premixing flow passages made of holes formed in said disc member and having flow diameter areas larger than diameter areas of fuel jet holes of said plurality of fuel nozzles, respectively; and
   wherein said plurality of fuel nozzles each jet fuel to approximately central portions of inlet portions of said premixing flow passages from an upstream side to a downstream side of said combustion chamber, respectively.

4. A method of operating a gas turbine combustor having a combustion chamber supplied with fuel and air, wherein fuel is jetted from a plurality of fuel nozzles from an upstream side to a downstream side of the combustion chamber through a plurality of holes each being formed in a disc member and each hole having an area larger than a diameter area of a fuel jet hole of each of the plurality of fuel nozzles with the jetted fuel being mixed with air in the holes.

* * * * *